Figure 1:
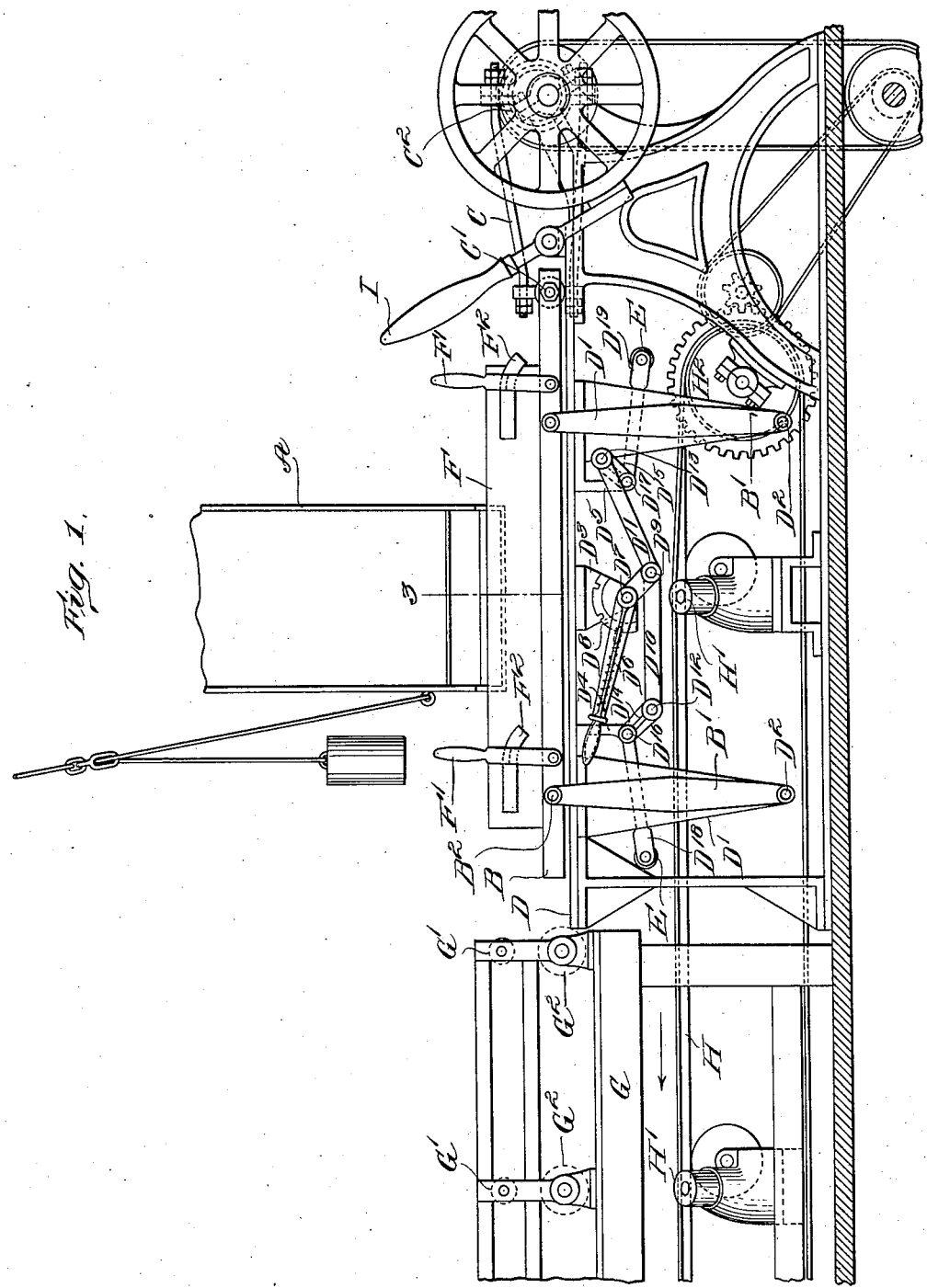

A. H. HALL.
MACHINE FOR STACKING TOOTHPICKS AND THE LIKE.
APPLICATION FILED APR. 22, 1911.

1,024,773.

Patented Apr. 30, 1912.

3 SHEETS—SHEET 1.

Witnesses:
Josephine H. Ryan
Charles D. Woodbury

Inventor:
Albert H. Hall
by Roberts Roberts & Cushman
Attys.

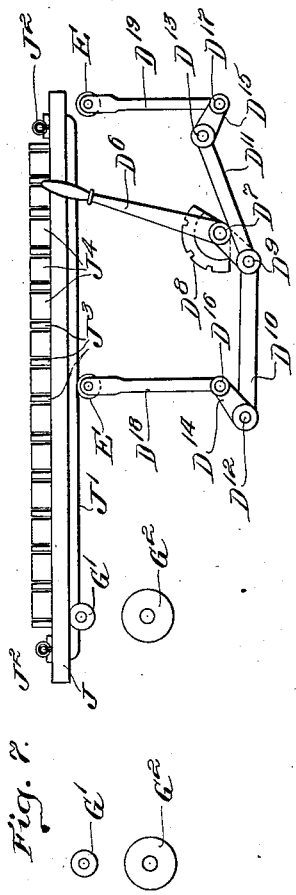

A. H. HALL.
MACHINE FOR STACKING TOOTHPICKS AND THE LIKE.
APPLICATION FILED APR. 22, 1911.
1,024,773. Patented Apr. 30, 1912.
3 SHEETS—SHEET 3.
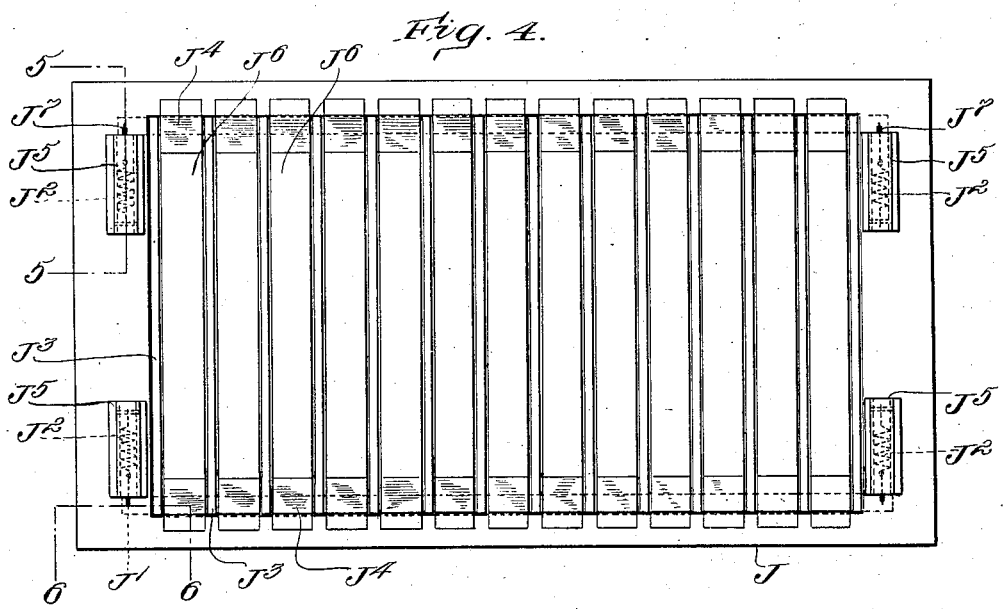
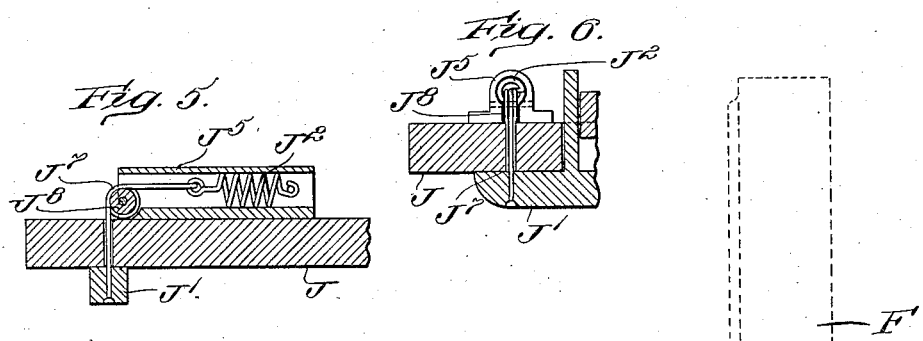
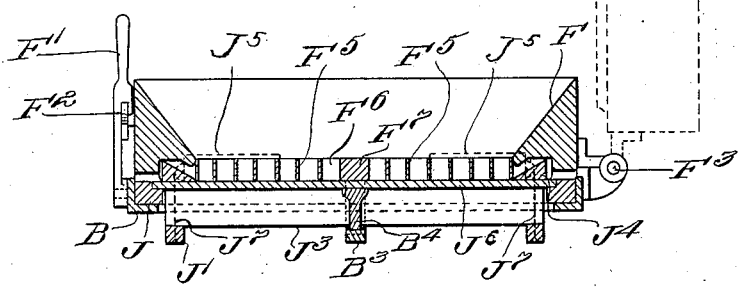
Witnesses:
Josephine H. Ryan
Charles S. Washburn
Inventor
Albert H. Hall
by Roberts, Roberts & Cushman
Attys.

UNITED STATES PATENT OFFICE.

ALBERT H. HALL, OF PERU, MAINE, ASSIGNOR TO FORSTER MANUFACTURING COMPANY, OF DIXFIELD, MAINE, A CORPORATION OF MAINE.

MACHINE FOR STACKING TOOTHPICKS AND THE LIKE.

1,024,773.

Specification of Letters Patent. Patented Apr. 30, 1912.

Application filed April 22, 1911. Serial No. 622,668.

*To all whom it may concern:*

Be it known that I, ALBERT H. HALL, a citizen of the United States, and resident of Peru, in the county of Oxford and State of Maine, have invented new and useful Improvements in Machines for Stacking Toothpicks and the Like, of which the following is a specification.

This invention relates to the manufacture of wooden toothpicks and like articles, and has for its object the provision of mechanism for arranging such objects as toothpicks in conveniently disposed piles or stacks from which they may be taken to be packed in boxes.

In the drawings hereto annexed, which illustrate an example of my invention—Figure 1 is a longitudinal elevation of a toothpick stacking machine upon which the stacking mechanisms are mounted and operate; Fig. 2 is a longitudinal view, partly in section, along the median line of the stacking devices; Fig. 3 is a vertical cross section showing a toothpick stacker locked in position upon a toothpick tray; Fig. 4 is a plan view of a toothpick tray; Fig. 5 is a detail on an enlarged scale showing a section taken on the line 5—5 of Fig. 4; Fig. 6 is a detail in section on the line 6—6 of Fig. 4; Fig. 7 is a detail showing toothpick tray lifting and transferring devices in one position; and Fig. 8 shows the tray lifting and transferring devices in another position.

Referring to Fig. 1, A represents the lower end of a spout or chute through which such objects as toothpicks may be delivered at will into the stacker presently to be described. The delivery end of the chute A is counterweighted as indicated and articulated in any convenient manner so that it may be lifted and lowered as desired. B represents a rectangular vibrator frame pivotally connected to and supported on the arms B' by the pivots B², the arms B' being supported on pivot pins D² secured to hangers D' which form part of the main frame D of the machine. The vibrator, represented by the frame B, is connected by means of the eccentric rods C and connections C' with an eccentric C², the rotation of which imparts a horizontal vibratory movement to the vibrator. Adjacent to the vibrator and the main frame on which it is mounted, there is arranged the way frame G which provides upper and lower ways in which the toothpick trays, presently to be described, travel outward from the vibrator to a place where they are emptied of toothpicks and inward to the vibrator in returning. The details of the tray conveying and transferring devices are described in an application for patent filed by me concurrently herewith, Serial No. 622,904. The stacker F is movably mounted on the vibrator frame B and is provided with means whereby it may be locked to the vibrator; such means being represented by the offset arms F² which engage with the locking levers F'. Below the vibrator and attached to the main frame D of the machine, there is arranged a tray handling mechanism which is shown separately and more clearly in Figs. 8 and 9 and will be described in connection with those figures.

The specific tray and stacking mechanisms which I prefer to employ are shown in detail in Figs. 2 to 6 inclusive. The tray consists of the frame J (see Fig. 4) rectangular in form, and slats $J^6$ which constitute the bottom of the tray on which the toothpicks rest. These slats are so spaced that the bottom of the tray is slotted transversely and in these transverse slots the vertically disposed slats $J^3$ are secured to longitudinal framework. Inclined blocks $J^4$ having the same width as the transverse bottom slats $J^6$ are secured along the sides of the tray. The rails J' are yieldingly held in position by means of cords $J^7$ which run over pulleys $J^8$ and are secured to springs $J^2$ arranged in tubular housings $J^5$. Four of such lifting springs are provided and the effect of their tension is to hold the rails J' close up against the under side of the tray J and thus constantly to urge the vertical slats $J^3$ upward. By this means the tray is transversely divided into compartments of each of which the ends are the blocks $J^4$ and the two sides are the slats $J^3$. The tray J is so proportioned that it substantially fits and rests upon the vibrator frame B. When the tray J is in place on the frame the stacker is then brought down upon it in the following manner: The stacker is a rectangular frame F hinged at $F^3$ to the vibrator frame B. The stacker F is divided transversely by partitions $F^6$ which are placed and spaced so as to register with the vertical slats $J^3$ of the tray J. The stacker is longitudinally divided by partitions F⁵ and has a central stiffening bar F⁷. When the stacker F is swung down upon the tray the vertical slats J³ are forced down against the tension of the springs J² until the bottom of the stacker comes to rest upon the transverse bottom slats J⁶ of the tray J. Then the locking arms F' are swung upward into engagement with the offset cam bars F² locking the stacker and tray firmly together and to the vibrator. Then a supply of toothpicks is drawn from the chute A and spread out in the stacker F, the vibrating mechanism is set in motion by the shipper lever (Fig. 1) and the vibrating motion of the stacker causes the picks to arrange themselves in each compartment formed by the partitions F⁵ and F⁶ and this is continued until these compartments are filled with toothpicks, all of which, by reason of the fact that the distance between any two adjacent longitudinal partitions is less than the length of a toothpick, are uniformly and regularly stacked parallel to the partitions F⁵. When the desired supply of picks has thus been stacked, the stacker F is unlocked and swung upward. The vertical slats J³ follow the transverse partitions F⁶ as the latter rise, and take their place, so that the evenly stacked toothpicks are prevented from being dislodged from their proper arrangement.

The mechanism for handling toothpick trays to lift them from or lower them upon the vibrator of this machine consists of the system of levers and links which are mounted on the hangers D³, D⁴, and D⁵ secured to the machine frame and seen in Fig. 1. In Figs. 7 and 8 this handling mechanism is shown in two positions, in Fig. 7 in the position for transferring a tray loaded with picks to the outgoing way provided with the idler rolls G'. The lever D⁶ which constitutes the handle is pivoted at D⁷ upon the notched sector D⁸. At D⁹ the links D¹⁰ and D¹¹ are pivoted and at their outer ends are pivotally secured at D¹² and D¹³ to the short arms D¹⁴ and D¹⁵ of the elbow levers D¹⁸ and D¹⁹ on the outer ends of which are mounted the antifriction rolls E. In Fig. 1 this lifting and handling system is shown in its retracted and inactive position. When a tray on the vibrator has been filled, the handle D⁶ is freed from engagement with the notched sector and swung to the right. This brings the rolls E into contact with the rails J' on the tray J lifting the tray to such a level that a horizontal movement on the rolls E will transfer the tray to the rolls G' in the outgoing way of the way frame. In Fig. 8 an empty tray is seen emerging from the incoming way on the rolls G². To receive the tray the system of levers is moved to mid position, the arm D⁶ being locked in the notched sector and the rolls E being at the proper level to receive the tray as it is rolled out of the way frame and is thus transferred from the rolls G² to the rolls E. When the tray is in proper position over the vibrator frame the handle D⁶ is disengaged from the notched sector and moved down to the position shown in Fig. 1 lowering the tray into position on the frame B.

What I claim and desire to secure by Letters Patent is:

1. In a machine for stacking toothpicks and like objects, the combination of a tray having a transversely slotted bottom, a framework of slats mounted to play up and down in the slots of the tray bottom, a stacker provided with transverse partitions to register with the movable slats of the tray, and means to secure the stacker to the tray and to vibrate both together.

2. In a machine for stacking toothpicks and like objects, the combination of a tray having a transversely slotted bottom, a framework of slats mounted to play up and down in the slots of the tray bottom, spring controlled supports for the framework of slats to urge the same upward, a stacker provided with transverse partitions to register with the movable slats of the tray, and means to secure the stacker to the tray and to vibrate both together.

3. In a machine for stacking toothpicks and like objects, the combination of a tray having a transversely slotted bottom, a framework of slats mounted to play up and down in the slots of the tray bottom, a stacker provided with transverse partitions to register with the movable slats of the tray, and with longitudinal partitions, and means to secure the stacker to the tray and to vibrate both together.

4. In a machine for stacking toothpicks and like objects, the combination of a tray having a transversely slotted bottom, and inclined blocks arranged along the sides of the tray between the slots in the bottom, a framework of slats mounted to play up and down in the slots of the tray bottom, a stacker provided with transverse partitions to register with the movable slats of the tray, and means to secure the stacker to the tray and to vibrate both together.

5. In a machine for stacking toothpicks and like objects, the combination of a tray having a transversely slotted bottom and inclined blocks arranged along the sides of the tray between the slots in the bottom, a framework of slats mounted to play up and down in the slots of the tray bottom, spring controlled supports for the framework of slats to urge the same upward, a stacker provided with transverse partitions to register with the movable slats of the tray, and means to secure the stacker to the tray and to vibrate both together.

6. In a machine for stacking toothpicks and like objects, the combination of a tray having a transversely slotted bottom, a framework of slats mounted to play up and down in the slots of the tray bottom, spring controlled supports for the framework of slats to urge the same upward, a stacker provided with transverse partitions to register with the movable slats of the tray, and with longitudinal partitions, and means to secure the stacker to the tray and to vibrate both together.

7. In a machine for stacking toothpicks and like objects, the combination of a tray having a transversely slotted bottom, a framework of slats mounted to play up and down in the slots of the tray bottom, a stacker provided with transverse partitions to register with the movable slats of the tray, means to secure the stacker to the tray and to vibrate both together, and lifter arms to raise or lower the tray.

8. In a machine for stacking toothpicks and like objects, the combination of a tray having a transversely slotted bottom, a framework of slats mounted to play up and down in the slots of the tray bottom, spring controlled supports for the framework of slats to urge the same upward, a stacker provided with transverse partitions to register with the movable slats of the tray, means to secure the stacker to the tray and to vibrate both together, and lifter arms to raise or lower the tray.

9. In a machine for stacking toothpicks and like objects, the combination of a tray having a transversely slotted bottom, a framework of slats mounted to play up and down in the slots of the tray bottom, a stacker provided with transverse partitions to register with the movable slats of the tray, and with longitudinal partitions, means to secure the stacker to the tray and to vibrate both together, and lifter arms to raise or lower the tray.

10. In a machine for stacking toothpicks and like objects, the combination of a tray having a transversely slotted bottom, and inclined blocks arranged along the sides of the tray bottom between the slots in the bottom, a framework of slats mounted to play up and down in the slots of the tray bottom, a stacker provided with transverse partitions to register with the movable slats of the tray, means to secure the stacker to the tray and to vibrate both together, and lifter arms to raise or lower the tray.

11. In a machine for stacking toothpicks and like objects, the combination of a tray having a transversely slotted bottom, and inclined blocks arranged along the sides of the tray between the slots in the bottom, a framework of slats mounted to play up and down in the slots of the tray bottom, spring controlled supports for the framework of slats to urge the same upward, a stacker provided with transverse partitions to register with the movable slats of the tray, means to secure the stacker to the tray and to vibrate both together, and lifter arms to raise or lower the tray.

12. In a machine for stacking toothpicks and like objects, the combination of a tray having a transversely slotted bottom, a framework of slats mounted to play up and down in the slots of the tray bottom, spring controlled supports for the framework of slats to urge the same upward, a stacker provided with transverse partitions to register with the movable slats of the tray, and with longitudinal partitions, means to secure the stacker to the tray and to vibrate both together, and lifter arms to raise or lower the tray.

Signed by me at Dixfield, Maine, this 14th day of April, 1911.

ALBERT H. HALL.

Witnesses:
 NATHANIEL B. WOODSUM,
 BLANCHE J. BISHOP.

Copies of this patent may be obtained for five cents each, by addressing the "Commissioner of Patents, Washington, D. C."